F. W. PEEK, Jr.
LIGHTNING ARRESTER.
APPLICATION FILED FEB. 10, 1909.

1,074,454.

Patented Sept. 30, 1913.
2 SHEETS—SHEET 1.

Witnesses.

Inventor
Frank W. Peek, Jr
by
Atty

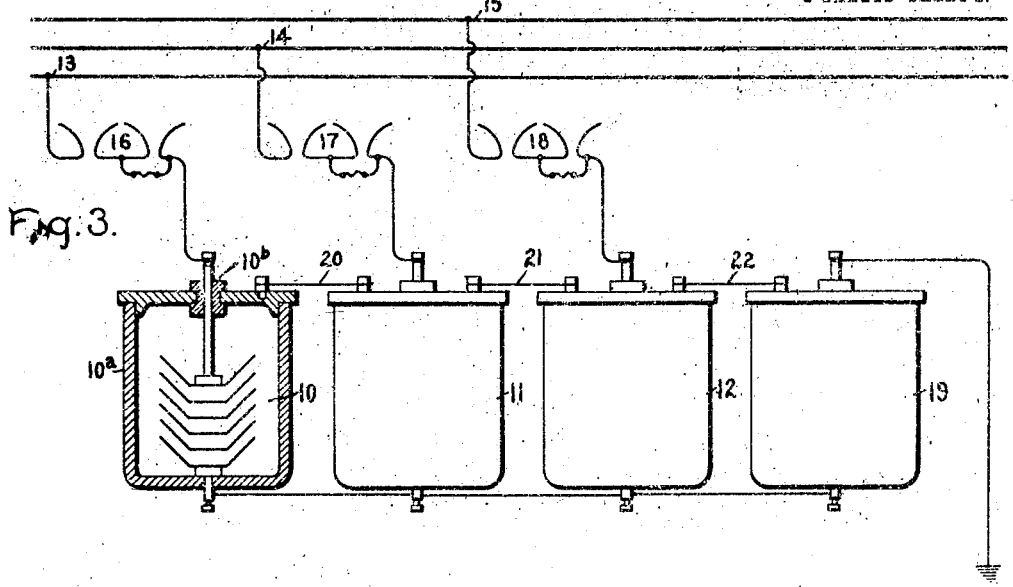
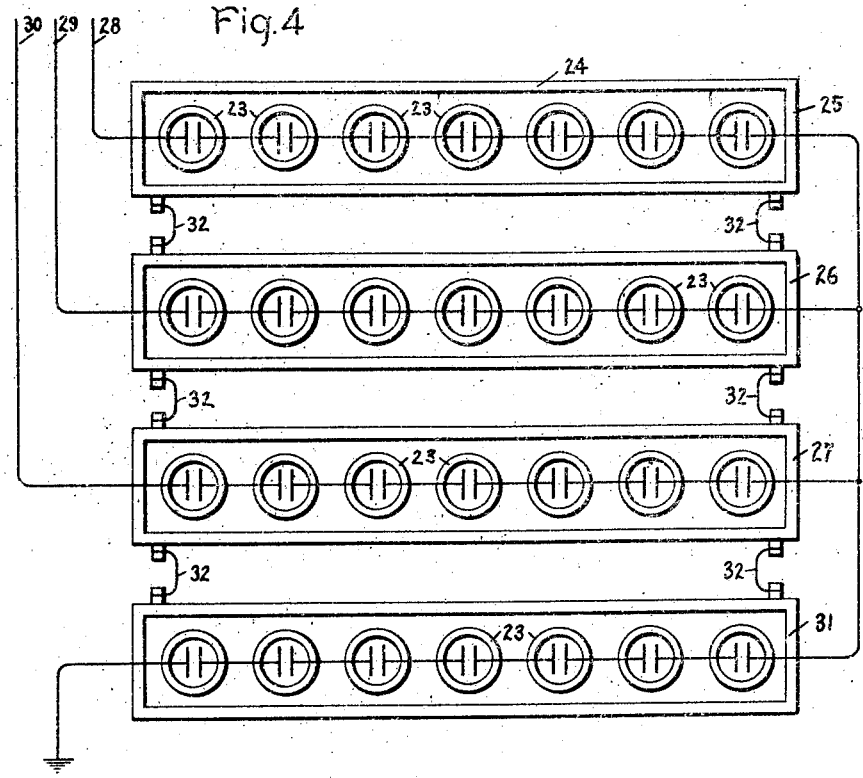

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

LIGHTNING-ARRESTER.

1,074,454.   Specification of Letters Patent.   Patented Sept. 30, 1913.

Application filed February 10, 1909. Serial No. 477,159.

*To all whom it may concern:*

Be it known that I, FRANK W. PEEK, Jr., a citizen of the United States, residing at Schenectady, county of Schenectady, State of New York, have invented certain new and useful Improvements in Lightning-Arresters, of which the following is a specification.

Protective discharge devices, such as lightning arresters, surge protectors and the like, necessarily possess an appreciable amount of self-induction, which even though it may be entirely negligible for direct or low frequency discharges, becomes of importance in connection with discharges of excessively high frequency. In order to render the protection of an arrester circuit against high frequency discharges as effective as possible, it is, therefore, important to reduce the self-induction of the discharge circuit to a minimum.

According to my invention, a closed electrical circuit is placed in inductive relation to the discharge circuit, the closed electrical circuit acting as a secondary, and, according to well-known electrical laws, absorbing the lines of force established around the primary circuit by the generation of a current, and in this manner reducing the self-induction of the discharge circuit.

Figure 1:
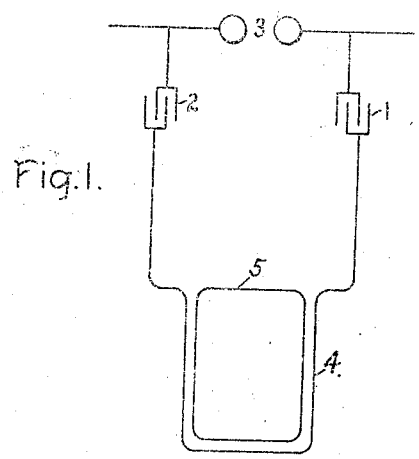
Figure 2:
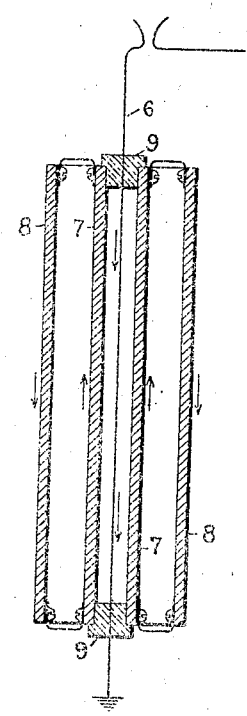

Figure 1 illustrates diagrammatically the relation of the primary discharge circuit and the closed secondary circuit; Fig. 2 shows somewhat diagrammatically a single straight discharge circuit surrounded by two concentric conductive sheaths electrically connected at each end; Fig. 3 illustrates an embodiment of my invention in connection with the well-known form of aluminum cell gap lightning arrester; and Fig. 4 illustrates my invention as applied to an aluminum cell no-gap surge protector.

Fig. 1 illustrates in its simplest form an oscillatory circuit containing the condensers 1, 2, and a spark gap 3. The closed circuit 4 is interlinked inductively with the closed circuit 5. As already explained above, a current in circuit 4 induces a current in circuit 5, thus decreasing the self-induction in the circuit 4. The effect of a closed electrical circuit upon the self-induction of another circuit in inductive relation thereto is so well understood by those skilled in the art that further explanation is not necessary.

In Fig. 2 the discharge circuit 6 is surrounded by two concentric conductive sheaths 7, 8, insulated from the circuit 6 by suitable bushings 9. The sheaths 7, 8 are connected electrically at the top and bottom, as clearly shown. A discharge to ground through the circuit 6, as indicated by the arrows, will induce a current in the opposite direction in sheath 7; the sheath 8 being removed a greater distance from the wire 6 will have no appreciable current induced in it, and the effect will, therefore, be that the current will circulate through the closed circuit represented by sheaths 7 and 8 in the direction as indicated by the arrows.

Fig. 3 shows the well-known form of electrolytic aluminum condenser cells connected to a three-phase transmission system. The cells 10, 11, 12 are connected respectively to the lines 13, 14, 15 through the spark gaps 16, 17, 18. The cells 10, 11, 12 are all connected to a common neutral, and the cell 19 is connected between the neutral point and ground. As is well understood, the aluminum arrester cell consists essentially of a plurality of aluminum plates immersed in a suitable electrolyte. The particular form of cell shown in connection with this figure is illustrated diagrammatically by cell 10, shown in section. The aluminum plates are tray-shaped, serving to contain the electrolyte, and are superimposed upon each other. They are inclosed in a metallic container 10ª, one terminal being insulated therefrom by a suitable bushing 10ᵇ, and the other terminal being in contact with the container. The plates are commonly surrounded by an insulating bath of oil. The metallic containers of the cells being already connected electrically, the lower ends can be made to serve as part of the interlinked secondary circuit by merely connecting electrically the upper ends. According to the present embodiment of my invention this is done by means of wires 20, 21, 22. A surge from conductor 13 to conductor 14 of the transmission system, for example, which passes through cells 10 and 11, induces a current in the closed circuit formed by the containers of these cells and their metallic connections in the same manner as illustrated diagrammatically in Fig. 1.

Fig. 4 shows a similar scheme of connections as applied to a form of no-gap lightning arrester, commonly known as the surge protector. This form of arrester consists of a plurality of aluminum condenser cells 23 connected in series and inclosed in an oil-containing tank 24, most commonly made of iron. The groups of cells 25, 26, 27 are connected respectively to the conductors 28, 29, 30 of the transmission system. In the system here shown they are connected to a neutral similarly to the cells illustrated in Fig. 3, and the group of cells 31 is connected between the neutral and ground. Corresponding ends of the metallic tanks are connected by electrical conductors 32. It is obvious that a surge from conductor 28 through the groups of cells 25 and 26 to conductor 29 will induce a current in the closed interlinked circuit formed by the metallic containers of these groups and their connections, and in this manner reduces the self-induction of the circuit.

What I claim as new and desire to secure by Letters Patent of the United States, is,—

1. In a lightning arrester, the combination of a discharge path of low impedance to high frequency oscillations and a permanently closed electrical circuit of low impedance inductively interlinked with said discharge path and subject only to those electromotive forces which are induced in it by discharges in said discharge path.

2. The combination of a plurality of electrolytic lightning arrester cells, metallic containers for said cells, and electrical connections for the adjacent upper and lower portions of said containers.

3. The combination of a plurality of electrolytic lightning arrester cells connected to a transmission system, metallic containers for said cells, and electrical connections between said containers for forming a closed electrical circuit interlinked inductively with said cells.

4. The combination with a line conductor, of an electrolytic cell connected to said conductor and forming one side of a discharge circuit, and a closed electrical circuit of low impedance inductively interlinked with said cell to decrease the self-induction of said discharge circuit.

5. The combination of line conductors, electrolytic condenser cells in operative relation thereto, and metallic connections in inductive relation to said cells for forming a closed electrical circuit of low impedance and thereby decreasing the self inductance of the circuit through said cells.

6. In a protective device, the combination with a transmission line, of a surge protector comprising a current conductor operatively related to said transmission line and forming a path for high frequency oscillatory currents, and a permanently closed electrical circuit inductively interlinked with said current conductor.

In witness whereof I have hereunto set my hand this 8th day of February, 1909.

FRANK W. PEEK, Jr.

Witnesses:
BENJAMIN B. HULL,
HELEN ORFORD.